United States Patent
Aupetitgendre et al.

(10) Patent No.: US 9,810,265 B2
(45) Date of Patent: Nov. 7, 2017

(54) BEARING HAVING A SEALING FLANGE

(71) Applicants: Elie Aupetitgendre, St-Cyr-sur Loire (FR); Benoit Arnault, St-Cyr-sur Loire (FR); Laurent Varnoux, Saint Avertin (FR)

(72) Inventors: Elie Aupetitgendre, St-Cyr-sur Loire (FR); Benoit Arnault, St-Cyr-sur Loire (FR); Laurent Varnoux, Saint Avertin (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/144,040

(22) Filed: May 2, 2016

(65) Prior Publication Data
US 2016/0327095 A1 Nov. 10, 2016

(30) Foreign Application Priority Data
May 4, 2015 (FR) ...................... 15 53963

(51) Int. Cl.
*F16C 33/78* (2006.01)
*F16C 19/06* (2006.01)
(Continued)

(52) U.S. Cl.
CPC .......... *F16C 33/7823* (2013.01); *F16C 19/06* (2013.01); *F16C 33/6607* (2013.01);
(Continued)

(58) Field of Classification Search
CPC ........ F16C 19/06; F16C 33/76; F16C 33/768; F16C 33/782; F16C 33/7823; F16C 33/7863; F16C 33/6607; F16C 33/6618; F16C 33/763; F16J 15/3264
USPC ........ 384/477–478, 481, 484–486, 488, 462, 384/474; 277/349, 353, 407, 552–553, 277/928, 406, 549, 350
See application file for complete search history.

(56) References Cited

U.S. PATENT DOCUMENTS 2,741,500 A * 4/1956 Large .................. F16C 33/7843
277/353
2,856,208 A * 10/1958 Cobb .................. F16C 33/7859
277/369
(Continued)

FOREIGN PATENT DOCUMENTS

EP          198324 A2 * 10/1986 ............. F16C 33/78
FR         1017809 A    12/1952
(Continued)

*Primary Examiner* — Marcus Charles
(74) *Attorney, Agent, or Firm* — Bryan Peckjian; SKF USA Inc. Patent Dept.

(57) ABSTRACT

The bearing provides an outer ring, an inner ring, at least one seal to one of the rings and cooperating with the other ring, and at least one sealing flange. The sealing flange includes a fixing portion to fix the flange to the other ring, an end portion and a connecting portion to connect the fixing portion and end portion. The end portion of the flange is curved and disposed axially facing the connecting portion. The curved end portion and connecting portion define an annular space that open radially towards the other ring. The curved end portion is mounted axially in contact against an outer lateral face of the seal.

18 Claims, 3 Drawing Sheets

(51) Int. Cl.
*F16C 33/76* (2006.01)
*F16C 33/66* (2006.01)

(52) U.S. Cl.
CPC .......... *F16C 33/6618* (2013.01); *F16C 33/76* (2013.01); *F16C 33/768* (2013.01); *F16C 33/782* (2013.01); *F16C 33/7863* (2013.01)

(56) References Cited

U.S. PATENT DOCUMENTS

| | | | | |
|---|---|---|---|---|
| 3,639,016 | A * | 2/1972 | Bourgeois | F16C 33/6618 277/349 |
| 3,869,182 | A * | 3/1975 | Glifberg | F16C 33/78 384/485 |
| 4,632,404 | A * | 12/1986 | Feldle | F16C 33/7859 277/348 |
| 4,687,349 | A * | 8/1987 | Pachuta | F16C 13/006 277/375 |
| 4,863,293 | A * | 9/1989 | Sytsma | F16C 13/006 277/366 |
| 5,046,868 | A * | 9/1991 | Albert | F16C 33/78 277/358 |
| 5,333,956 | A * | 8/1994 | Hoffman | B65G 39/09 277/348 |
| 5,860,748 | A * | 1/1999 | Okumura | F16C 33/7853 277/562 |
| 8,585,296 | B2 * | 11/2013 | Yamaguchi | F16C 33/7853 277/347 |
| 8,628,249 | B2 * | 1/2014 | Winkelmann | F16C 19/163 277/552 |
| 9,546,686 | B2 * | 1/2017 | Aupetitgendre | F16C 33/6607 |

FOREIGN PATENT DOCUMENTS

| | | | | |
|---|---|---|---|---|
| JP | 62067365 | A * | 3/1987 | ......... F16H 57/0469 |
| JP | 2009008163 | A * | 1/2009 | ......... F16C 33/7863 |
| JP | 2012132542 | A | 7/2012 | |
| JP | 2013002598 | A | 1/2013 | |
| WO | 2010/133240 | A1 | 11/2010 | |

\* cited by examiner

BEARING HAVING A SEALING FLANGE

CROSS-REFERENCE TO RELATED APPLICATIONS

This is a Non-Provisional Patent Application, filed under the Paris Convention, claiming the benefit of French Patent Application Number 1553963, filed on May 4, 2015, which is incorporated herein by reference in its entirety.

FIELD OF THE INVENTION

The present invention relates to the field of bearings, and particularly those used in automotive or industrial applications.

BACKGROUND OF THE INVENTION

In a bearing, one or more seals are typically used to maintain lubricant, such as grease, inside the bearing and to prevent the entry of contaminating particles. Typically, such seals are fixed on one of the bearing rings and cooperate with the other ring so as to form a dynamic sealing.

The patent application WO-A1-2010/133240 (SKF) discloses a rolling bearing providing two seals fixed to the outer ring and each providing an inner lip in frictional contact with the inner ring. The bearing further provides two sealing flanges fixed to the inner ring and against which an outer lip of the associated seal is sliding.

The use of such a flange axially on each side of the bearing and cooperating with the outer lip of the associated seal permit to limit the passage on contaminating particles to the inner lip of the seal in frictional contact with the inner ring. However, the contact pressure exerted by the elastomeric outer lip on the flange tends to decrease over time, and in case of relative angular tilting of the bearing rings. This may affect the sealing properties of the bearing in operation. Moreover, this solution requires the use of specific seals providing each an outer lip.

The present invention aims to overcome this disadvantage.

SUMMARY OF THE INVENTION

More particularly, the present invention aims to provide a bearing having an improved sealing.

The present invention further aims to provide a bearing easy to manufacture and to assemble.

In one embodiment, the bearing provides an outer ring, an inner ring, at least one seal fixed to one of the rings and cooperating with the other ring. Bearing further provides at least one sealing flange providing a fixing portion for fixing the flange to the other ring, an end portion and a connecting portion to connect the fixing portion and end portion.

End portion of the flange is curved and axially arranged opposite to the connecting portion. The curved end portion and connecting portion define an annular space that is radially open towards the other ring. The curved end portion is axially mounted in contact against an outer lateral face of the seal.

Sealing flange can be manufactured at low cost. Curved end portion of flange ensures sealing by axial contact with the associated seal. Seal can also be of conventional design, i.e. without any outer sealing lip intended to cooperate with the flange. Moreover, the length in the radial direction of the curved end portion can be easily adjusted according to the level of axial load to be applied to the seal. Moreover, the annular space defined between the curved end portion and the connecting portion can be used as lubricant reservoir so as to lubricate the one or more contact areas between the seal and the flange. Lubricant can be provided in the space during the bearing assembly, or the space may be reached by centrifugation from a chamber in communication between the seal and the flange and in which is disposed the lubricant during assembly.

Moreover, any contact with a sharp edge of the curved end portion of sealing flange with seal is prevented so as to avoid any deterioration of the seal.

In one embodiment, the sealing flange is at last partly elastically deformable in the axial direction, at least the connecting portion being axially deformed towards the exterior of bearing by the axial contact between the curved end portion and the seal.

The axial deformation of at least the connecting portion combined with the elastic characteristic of flange permits to maintain the sealing between the flange and seal over time. In response to the deformation of at least the connecting portion against its own elasticity, the curved end portion of the flange exerts a permanent axial load on the seal.

The fixing portion of flange may be axially mounted in contact against a front surface of the other ring.

In one embodiment, the curved end portion of the flange provides at least one through hole formed in its thickness to allow diffusion of the lubricant contained in the annular space towards the axial contact with the seal.

End curved portion of the flange may have a corrugated shape.

In one embodiment, the seal provides a seal gasket made of a soft material and defining the outer lateral face, at least the end curved portion of sealing flange being made of a rigid material.

Preferably, the sealing flange is made in one piece and/or provides a constant thickness.

In one embodiment, the sealing flange is made of metal. Alternatively, the connecting portion of the flange may be made of a soft material, in particular a synthetic or polymer material. The end curved portion, the fixing portion, the connecting portion may made of the same material or different materials.

BRIEF DESCRIPTION OF THE DRAWINGS

The present invention will be better understood by the detailed description of embodiments as non-limiting examples of the invention and illustrated by the annexed figures, wherein.

DETAILED DESCRIPTION OF THE INVENTION

Figure 1:
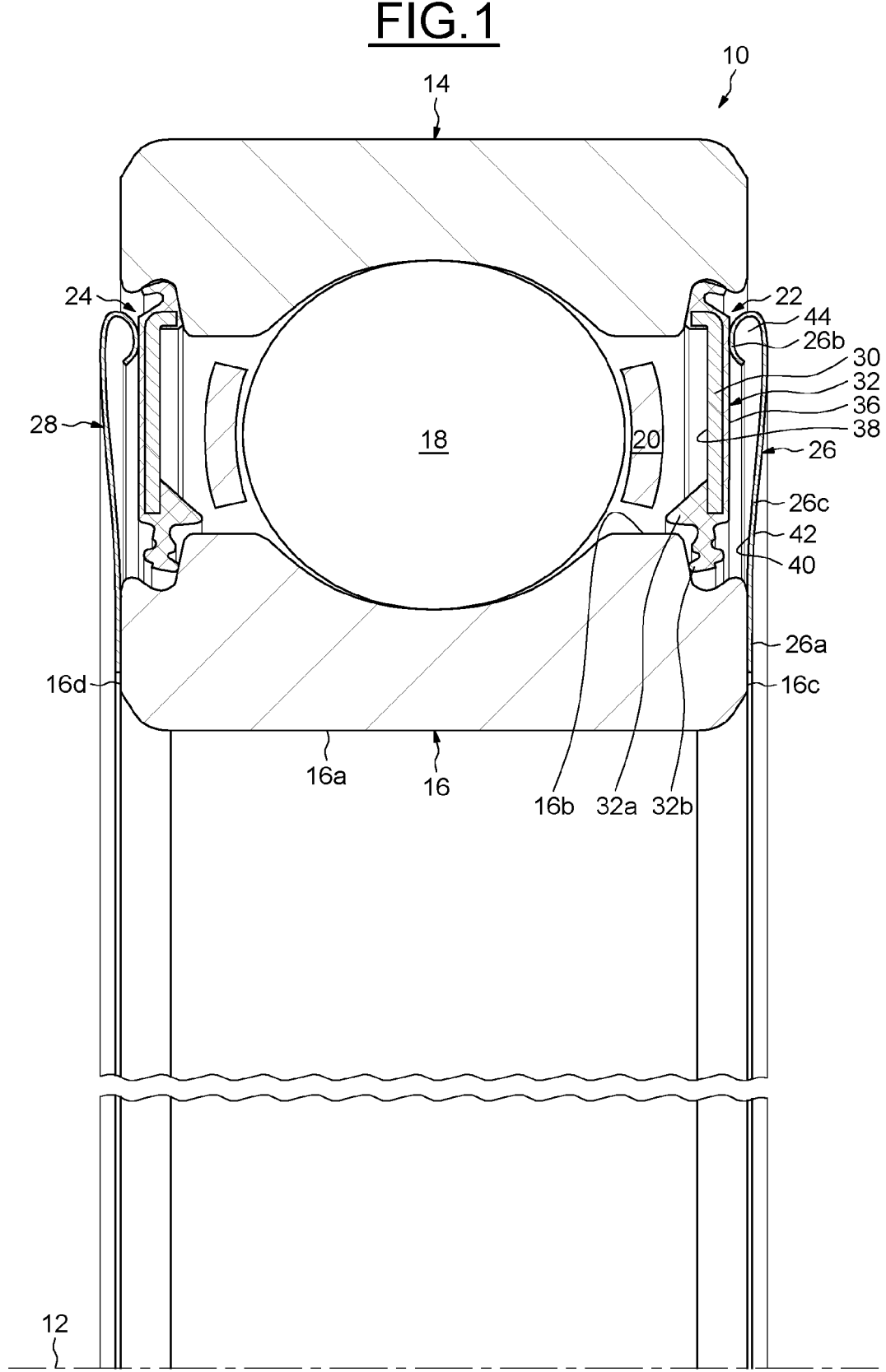
FIG. 1 is an axial sectional half-view of a bearing according to a first embodiment of the invention.

In FIG. 1, a rolling bearing 10, of axis 12, provides an outer ring 14, an inner ring 16, a plurality of rolling elements 18, here balls, radially arranged between rings and a cage 20 to maintain rolling elements as regularly circumferentially spaced.

The bearing 10 provides axially on each side an annular seal 22, 24 to close the radial space defined between the inner ring 16 and the outer ring 14. The bearing 10 further provides axially on each side an annular sealing flange 26, 28 that axially contacts the seal 22, 24 on the outer side of the bearing 10. In the illustrated embodiment, seal 22, 24 are fixed to the outer ring 14 and the sealing flanges are fixed to the inner ring 16.

The outer ring 14 provides an outer axial cylindrical surface, a cylindrical bore, two opposite front surfaces that axially delimit the bore and outer surface, and a raceway provided on bore and having an inner concave profile adapted for rolling elements 18, the raceway being radially inwardly directed. The outer ring 14 further provides two annular grooves provided on bore, the grooves radially outwardly extending and axially disposed on either side of the rolling elements 18. In FIG. 1, the different parts of the outer ring 14 are not referenced.

The inner ring provides a cylindrical bore 16*a*, an outer axial cylindrical surface 16*b*, two radially opposed front surfaces 16*c*, 16*d* that axially delimit the bore and outer surface, and a raceway provided on the outer surface 16*b* and having an inner concave profile adapted for rolling elements 18, the raceway being radially outwardly directed. Cage 20 is radially disposed in the radial space defined between the outer surface 16*b* of the inner ring 16 and the bore of the outer ring 14.

The inner ring 16 further provides two annular grooves, not referenced, provided on the outer surface 16*b*, radially inwardly extending and axially disposed on either side of the rolling elements 18. Each of the grooves of the inner ring is radially opposite to a corresponding groove of the outer ring.

Each seal 22, 24 is radially disposed between the outer ring 14 and the inner ring 16, and fixed to the outer ring 14 so as to be laterally disposed with respect to the rolling elements 18. Each seal 22, 24 is fixed in one of the grooves of the outer ring 14. Each seal 22, 24 is entirely fit in the radial space defined between the outer ring 14 and the inner ring 16. Each seal 22, 24 is axially offset to the inner side of the bearing with respect to the associated front surface of the outer ring.

In this embodiment, seals 22, 24 are identical and symmetrical with respect to the radial median plan of bearing 10. Both seals 22, 24 being identical, we will now describe only one of the two.

Seal 22 provides an annular rigid insert 30 and an annular soft seal gasket 32 fixed to the insert 30. Insert 30 is made of a rigid material, for example in metal or a thermoplastic material, notably polyamide. Insert 30 forms a stiffening insert for the seal gasket 32. Seal gasket 32 is overmoulded or vulcanized onto the insert 30. Seal gasket 32 is made of a soft material, for example an elastomer such as nitrile rubber or in thermoplastic elastomer.

Seal gasket 32 covers an outer surface of insert 30. Seal gasket 32 covers an outer lateral face of insert 30. Seal gasket 32 provides an annular outer lateral face 36 axially directed from the outer side of bearing 10 towards the associated sealing flange 26. The outer lateral face 36 is axially offset towards the inner side of bearing 10 with respect to the front surfaces of the inner ring 16 and the outer ring 14. The outer lateral face 36 of seal gasket 32 forms the outer lateral face of seal 22. The outer lateral face 36 is flat. The outer lateral face 36 radially extends. An inner lateral face 38 is axially opposed to the outer lateral face 36 and is axially directed towards the interior of bearing 10. The inner lateral face 38 is defined by insert 30 here.

Seal gasket 32 forms two sealing portions that are radially opposed and exerting a static seal with the inner ring 14 and a dynamic seal with the outer ring 16. More precisely, a "static seal" is the seal formed between two parts without relative movement, and a "dynamic seal" is the seal between two parts with relative movement.

The outer sealing portion of gasket 32 is force-fitted in the associated groove of the outer ring 14 so as to fix the seal 22 in the ring 14. Only the gasket 32 is in contact with the outer ring 14. A good holding in position of the seal 22 is enabled by a mounting with force-fitting and friction. In the illustrated embodiment, the inner sealing portion of gasket 32 provides a first lip 32*a* and a second lip 32*b*. Lips 32*a*, 32*b* are annular and concentric, and axially extend towards the interior of bearing 10. The lip 32*b* contacts a radial wall of the groove of inner ring 16. The inner lip 32*a* has a diameter greater than the lip 32*b* and radially surrounds the outer surface 16*b* of the inner ring 16 so as to form a narrow passage of labyrinth type with the outer surface.

Each sealing flange 26, 28 is axially offset relative to the associated seal 22, 24 to the outer side of bearing 10. Each sealing flange 26, 28 is axially bearing against one of the frontal surfaces 16*c*, 16*d* of the inner ring 16 and bears against the seal gasket 32 of the associated seal 22, 24. Sealing flanges 26, 28 are symmetrical with each other relative to a transversal radial plan passing through the center of bearing 10. Both sealing flanges 26, 28 being identical, we will now describe only one of the two.

Sealing flange 26 is fixed to the inner ring 16 and axially extends towards the outer ring 14. Sealing flange 26 is fixed to the inner ring 16 by any appropriate means, such as gluing or welding. Sealing flange 26 is axially mounted in contact with the front surface 16*c* of the inner ring 16. Sealing flange 26 is fixed on the front surface 16*c*. In the illustrated embodiment, sealing flange 26 is mounted in direct contact against the inner ring 16. Alternatively, an intermediate element could be interposed axially between the inner ring 16 and the flange 26.

Sealing flange 26 is axially in contact against the outer lateral surface 36 of seal 22. Flange 26 provides an inner lateral face 40 that is axially oriented to the seal 22 and contacts against the seal 22, and an outer lateral face 42 that is axially oriented towards the exterior of bearing 10, except on an end portion as it will be further explained. The inner lateral face 40 and the outer lateral face 42 axially define the thickness of flange 26. In the illustrated embodiment, flange 26 is mounted axially in direct contact with seal 22.

Flange 26 provides an annular fixing portion 26*a* mounted axially in contact against the front surface 16*c* of the inner ring 16, and an annular curved end portion 26*b* mounted axially in contact against the seal 22. Flange 26 further provides an annular radial connecting portion 26*c* that extends between the fixing portion 26*a* and the curved end portion 26*b* to connect them. Connecting portion 26*c* radially extends the fixing portion 26*a* and is radially extended by the support portion 26*b*. In the illustrated embodiment, the curved end portion 26*a* of flange 26 has a purely radial shape. Fixing portion 26*a* forms an inner portion of the flange 26. Curved end portion 26*b* forms an outer or end portion of the flange 26.

End portion 26*b* extends from connecting portion 26*c*. End portion 26*b* is curved towards the seal 22. Curved end portion 26*b* is axially mounted against the seal gasket 32 of seal 22. Only the curved end portion 26*b* of flange 26 is mounted in contact against seal 22. The contact between the curved end portion 26*b* of flange 26 and the seal 22 is annular. In the illustrated embodiment, there is a single annular contact area between the curved end portion 26b of flange 26 and seal 22.

End portion 26b of flange 26 is curved towards the inner ring 16. Curved end portion 26b is folded on the side of the inner face 40 of flange 26. End portion 26b is axially arranged between the connecting portion 26c of flange 26 and seal 22. Since the end portion 26b is curved, the outer lateral face 42 is there oriented axially towards the seal 22 and the inner lateral face 40 is there oriented axially towards the opposite direction to the seal 22. In the area of the end portion 26b, the outer lateral face 42 is axially in contact against the seal 22. In the illustrated embodiment, the curved end portion 26b is axially concave on the exterior side, and convex on the interior side. Then friction between the seal 22 and the flange 26 is reduced. End portion 26b has a C-shape profile oriented towards the connecting portion 26c of flange 26.

Curved end portion 26b of flange 26 is disposed axially to face the connecting portion 26c. Curved end portion 26b is disposed axially to face an area of larger diameter of the connecting portion 26c. There is no contact in the axial direction between end portion 26b and connecting portion 26c. An annular space or chamber 44 is defined by the curved end portion 26 and the connecting portion 26c. Space 44 is radially open to the side of the inner ring 16.

In the illustrated embodiment, flange 26 is made as a single piece. Flange 26 is made of a rigid material, for example in metal and advantageously made from a cut and stamped flank of metal sheet. In this case, curved end portion 26b is advantageously formed by deformation of the free end of flange during stamping operations. Alternatively, flange 26 may be made of another rigid material, for example a molded synthetic material such as polyamide. In this case, the curved end portion 26b may be made during molding operations.

Flange 26 is axially deformed towards the exterior of bearing 10 by the axial contact between the curved end portion 26b and the seal 22. Connecting portion 26c of flange 26 is axially deformed towards the exterior by the axial contact. Connecting portion 26c is deformed against its own elasticity. Flange 26 is axially preloaded by the contact with seal 22. In the preloaded state, the axial distance between the fixing portion 26a and the curved end 26b on the side of inner lateral face 40 is less than the axial distance between the portions in the free state of flange or unsolicited.

The connecting portion 26c of flange 26 tends to return to its unloaded or axially unsolicited position, by elasticity. The support portion 26b of flange 26 exerts a permanent axial load on seal 22. Good sealing properties are maintained over time thanks to the continuous sliding axial contact between the support portion 26b of flange 26 and the seal 22. Indeed, the arrival of contaminating particles is limited between the support portion 26b and seal 22. The arrival of the contaminating particles is limited until the dynamic sealing portion of seal 22 that cooperate with the inner ring 16.

During the assembly of bearing 10, lubricant (not shown), for example grease, is provided in the sealed chamber defined between each seal 22, 24 and the associated sealing flange 26, 28. Each chamber is axially defined by the outer lateral face 36 of seal of the inner lateral face 40 of the associated flange. Space 44, defined axially by the curved end portion 26b and the part of the connecting portion 26c that is axially facing the curved end portion 26b, is communicated with the associated chamber. During rotation of the inner ring 16, centrifugal force tends to project lubricant towards space 44 so as to form a lubricant reservoir that could serve to lubricate the contact between seal 22 and the curved end portion 26b of flange 26.

Figure 2:
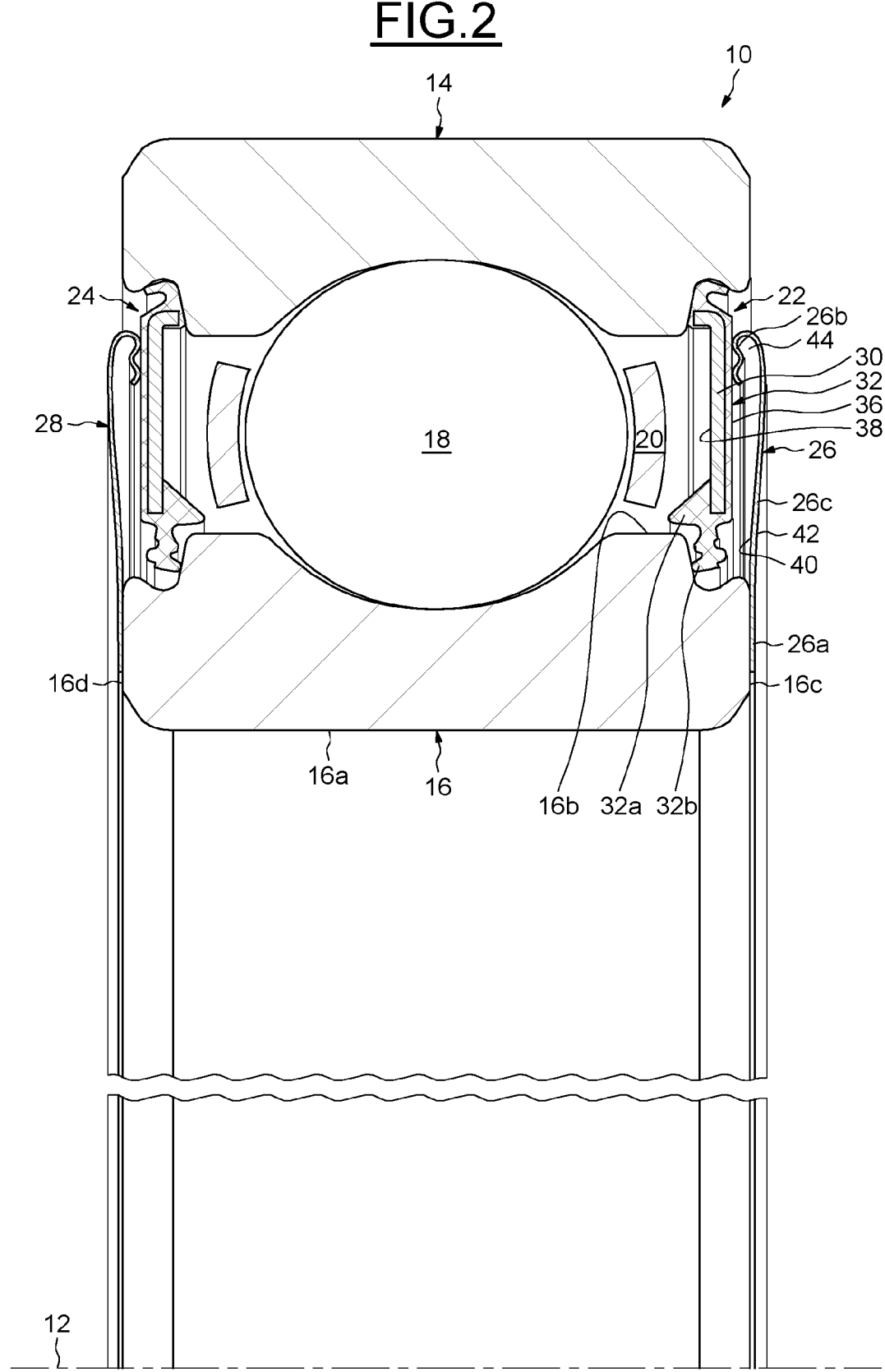
FIG. 2 is an axial sectional half-view of a bearing according to a second embodiment of the invention.

The embodiment illustrated in FIG. 2, in which the same elements have the same references, differs from the previous embodiment in that the curved end portion 26b of flange 26 has a corrugated shape. In this embodiment, there are two areas of annular and concentric contact between the curved end portion 26b and the seal 22. During assembly, lubricant can also be provided in the annular space defined between these two contact areas. Alternatively, more contact areas could be provided.

Figure 3:
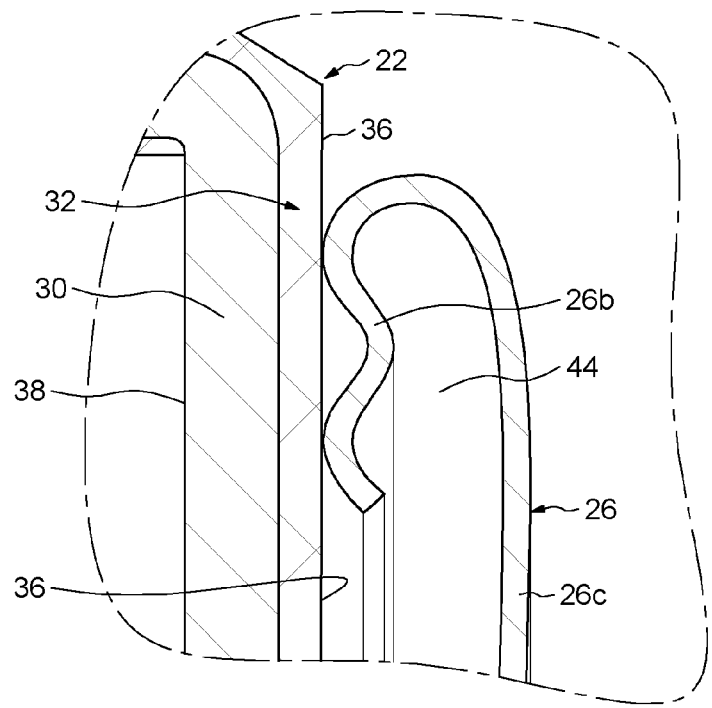
FIG. 3 is a detailed view of a sealing flange of bearing of FIG. 2.
Figure 4:
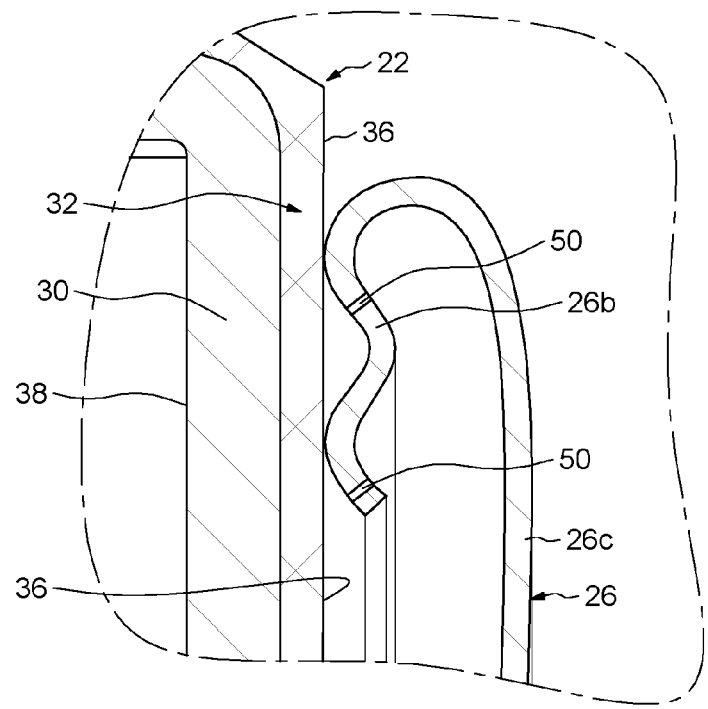
FIG. 4 is an axial sectional half-view of a bearing according to a third embodiment of the invention.

Alternatively, as illustrated in FIG. 3, in which the same elements have the same references, the curved end portion 26b of flange 26 provides a plurality of through holes 50 in the thickness of the portion 26b to promote the diffusion of lubricant stored in space 44 towards the contact areas with seal 22. Preferably, holes 50 are distributed over the entire circumference of the curved end portion 26b. Holes 50 are distributed on the end portion 26b so as to prevent diffusion of lubricant out of the bearing 10. Holes 50 are radially offset to the inner ring 16 relative to the contact area of larger diameter between the end portion 26b and the seal 22.

In the illustrated embodiments, each sealing flange is elastically deformable in the axial direction and is deformed during its assembly by contact of the curved end portion with the seal. Good sealing properties are maintained over time between the seal and the associated sealing flange. Alternatively, each sealing flange could be not elastically deformable and not deformed during assembly by contact of the curved end portion with the seal.

In the illustrated embodiment, each sealing flange is fixed to one of the front surface of the inner ring. Alternatively, each flange could be fixed in an annular groove provided in the bore of the inner ring, for example by crimping. In this case, the fixing portion of flange may have an L-shape.

In the illustrated embodiments, each seal provides two parts, i.e. a stiffening insert and a seal gasket fixed to the insert and provided with at least one sliding lip cooperating with the inner ring. Alternatively, seal gasket may provide only one or more lips of labyrinth type cooperating with the inner ring. Alternatively, seal may provide only one part, i.e. the insert or the seal gasket.

In the illustrated embodiments, sealing flange is fixed to the inner ring and seal is fixed to the outer ring. Alternatively, the arrangement could by reversed with the seal fixed to the inner ring and the sealing flange fixed to the outer ring.

The invention is illustrated with a rolling bearing providing at least one row of rolling elements arranged between bearing rings. Alternatively, the bearing may be a sliding bearing providing two races or rings in direct sliding contact.

The invention claimed is:

1. A bearing comprising:
an outer ring,
an inner ring,
at least one seal fixed to one of the rings and cooperating with the other ring, and at least one sealing flange providing a fixing portion to fix the at least one sealing flange to the other ring,
the at least one sealing flange having an end portion and a connecting portion to connect the fixing portion and the end portion, wherein
the end portion of the at least one sealing flange is curved and disposed axially facing the connecting portion, wherein
the end portion and the connecting portion define an annular space that opens radially towards the other ring, wherein the end portion is configured to axially contact against an outer lateral face of the at least one seal, and wherein the at least one sealing flange is at least elastically deformable in an axial direction, at least the connecting portion of the at least one sealing flange being axially deformed towards an exterior of bearing due to axial contact between the end portion and the at least one seal.

2. The bearing according to claim 1, wherein the fixing portion of the at least one sealing flange is mounted axially in contact against a front surface of the other ring.

3. The bearing according to claim 1, wherein at least one lubricant is provided in the annular space.

4. The bearing according to claim 1, wherein the end portion of the at least one sealing flange provides at least one through hole formed axially through the end portion to allow the diffusion of lubricant provided in the annular space towards a location where the end portion axially contact with the at least one seal.

5. The bearing according to claim 1, wherein the end portion of the at least one sealing flange has a corrugated shape.

6. The bearing according to claim 1, wherein the at least one seal further comprises at least one seal gasket made of a soft material and defining the outer lateral face, at least the end portion of the at least one sealing flange being made of rigid material.

7. The bearing according to claim 1, wherein the at least one sealing flange is made as a single piece.

8. The bearing according to claim 1, wherein the at least one sealing flange has a constant thickness.

9. The bearing according to claim 1, wherein the sealing flange is made of metal.

10. A bearing comprising:
an outer ring,
an inner ring,
at least one seal fixed to one of the rings and cooperating with the other ring, and at least one sealing flange providing a fixing portion to fix the at least one sealing flange to the other ring,
the at least one sealing flange having an end portion and a connecting portion to connect the fixing portion and the end portion, wherein
the end portion of the at least one sealing flange is curved and disposed axially facing the connecting portion, wherein
the end portion and the connecting portion define an annular space that opens radially towards the other ring, wherein
the end portion is configured to axially contact against an outer lateral face of the at least one seal, and wherein the end portion of the at least one sealing flange provides at least one through hole formed axially through the end portion to allow the diffusion of lubricant provided in the annular space towards a location where the end portion axially contacts with the at least one seal.

11. The bearing according to claim 10, wherein the at least one seal further comprises at least one seal gasket made of a soft material and defining the outer lateral face, at least the end portion of the at least one sealing flange being made of rigid material.

12. The bearing according to claim 10, wherein the fixing portion of the at least one sealing flange is mounted axially in contact against a front surface of the other ring.

13. The bearing according to claim 10, wherein at least one lubricant is provided in the annular space.

14. The bearing according to claim 10, wherein the end portion of the at least one sealing flange has a corrugated shape.

15. A bearing comprising:
an outer ring,
an inner ring,
at least one seal fixed to one of the rings and cooperating with the other ring, and at least one sealing flange providing a fixing portion to fix the at least one sealing flange to the other ring,
the at least one sealing flange having an end portion and a connecting portion to connect the fixing portion and the end portion, wherein
the end portion of the at least one sealing flange is curved and disposed axially facing the connecting portion, wherein
the end portion and the connecting portion define an annular space that opens radially towards the other ring, wherein
the end portion is configured to axially contact against an outer lateral face of the at least one seal, and
wherein the end portion of the at least one sealing flange has a corrugated shape.

16. The bearing according to claim 15, wherein the at least one seal further comprises at least one seal gasket made of a soft material and defining the outer lateral face, at least the end portion of the at least one sealing flange being made of rigid material.

17. The bearing according to claim 15, wherein the fixing portion of the at least one sealing flange is mounted axially in contact against a front surface of the other ring.

18. The bearing according to claim 15, wherein at least one lubricant is provided in the annular space.

* * * * *